Jan. 12, 1960     J. G. CONSAUL ET AL     2,920,547

AUXILIARY SCREENING DEVICE

Filed May 2, 1956

INVENTORS.
JOHN G. CONSAUL
EDWIN VELTEN
BY

ATTORNEY

United States Patent Office 2,920,547
Patented Jan. 12, 1960

2,920,547

AUXILIARY SCREENING DEVICE

John George Consaul, Bayonne, and Edwin Velten, Gladstone, N. J., assignors to Art Color Printing Company, New York, N.Y., and Dunellen, N.J., a corporation of New York Application May 2, 1956, Serial No. 582,150

1 Claim. (Cl. 95—64)

This invention relates to an auxiliary screening device or stop for use in multicolor photogravure work, and is concerned particularly with certain improvements over the auxiliary screening device disclosed in Patent No. 2,703,281, issued to us on March 1, 1955.

One object of the invention is to provide an angularly adjustable device that may be easily and quickly applied to or withdrawn from the lens assembly of a camera of the kind used in photogravure work.

Another object of the invention is to provide an auxiliary screening device for a photogravure camera, which device consists essentially of two parts, one of which may be left in the lens assembly of the camera after removal or withdrawal of the other so that the camera may be used in the normal manner without any auxiliary screening.

A further object is to produce an auxiliary screening device of sturdy construction and simple design.

The device is illustrated in the accompanying drawings, in which.

Figure 1:
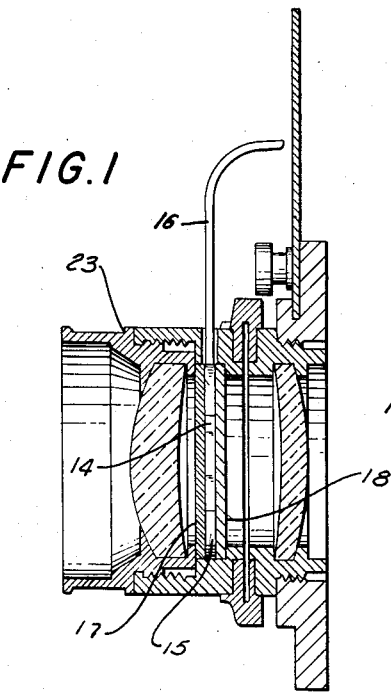
Fig. 1 is a cross-sectional view of the lens of a photogravure camera showing the auxiliary device of the present invention in place therein.
Figure 4:
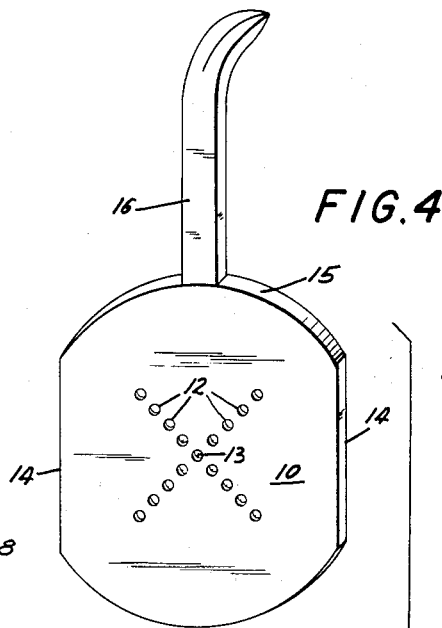
Figure 2:
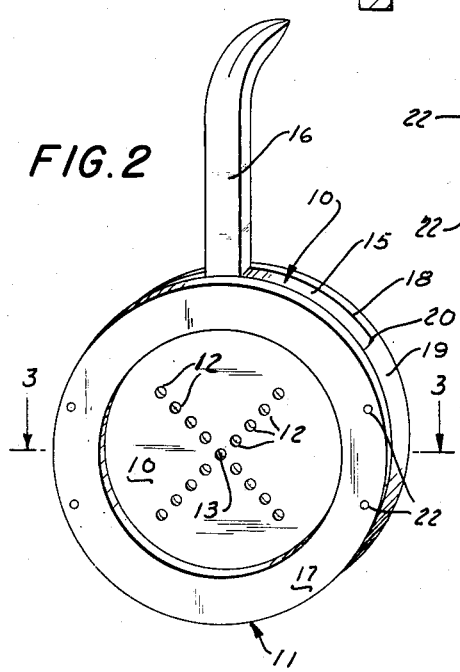
Fig. 2 is a perspective view of the device.
Figure 3:
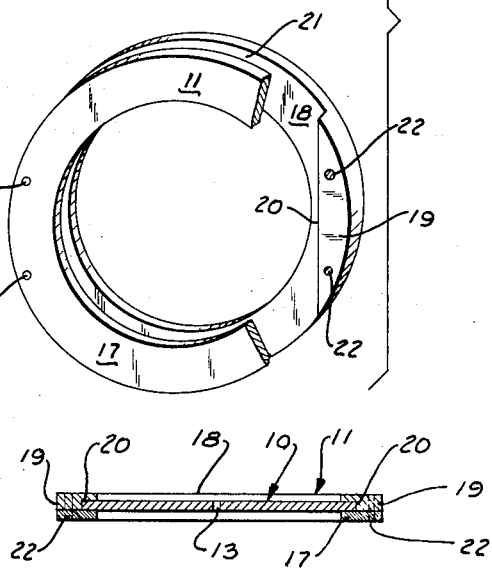
Fig. 3 is a transverse cross-sectional view thereof on the line 3—3 of Fig. 2; and, Fig. 4 is an exploded view in perspective of the two members of the device, the frame or lower member having parts broken away.

The device comprises a plate member 10 and an annular frame member 11. The plate member, which is the screening element or stop proper, has two rows of perforations 12 that cross each other at a right angle about a common central perforation 13. Each row consists of a like number of perforations and of the same size or diameter. The plate member has straight parallel sides 14 and curved upper and lower edges 15 of a curvature corresponding to that of the outer edges of the annular frame member. A handle 16 extending upward from the upper edge is provided for turning the device into different angular positions as may be required in multicolor photogravure work.

The annular frame member 11 is preferably made in two pieces, namely: an outer ring-shaped portion 17, and an inner ring-shaped portion 18 of the same size and diameter as the outer portion. The two portions are spaced apart a distance equal to the thickness of the plate member 10 to permit of insertion of the latter in the frame member. One means of spacing the two portions is to form or provide the inner portion 18 with segmental portions 19 that have opposed flat straight parallel faces 20, which faces are spaced apart a distance equal to the width between the sides 14 of the plate member. The faces 20 of the segmental portions serve as guides for inserting or sliding the plate member into place in the frame member through the opening 21 provided at the top of the frame. The inner and outer portions of the frame member may be secured together by rivets 22 or in any other suitable manner. In the inserted position of the plate member 10 its central perforation 13 will come into line with the center or axis of the circular opening of the frame member. The width of the peripheral opening 21 of the frame is substantially the same as the thickness of plate 10 to permit of inserting the plate into the frame through said opening.

In Fig. 1 of the drawings there is shown a conventional lens assembly 23 of a photogravure camera with which the auxiliary screening device is adapted to be used. The auxiliary screening device is movably mounted in the lens assembly so that it may be turned or adjusted angularly into desired positions with respect to the usual halftone screen.

While we have illustrated and described with particularity a preferred embodiment of the improved auxiliary screening device, it is to be understood that some modifications in the details thereof may be made within the scope of the appended claim.

What we claim is:

In the lens assembly of a photogravure camera, the combination of an annular frame rotatably mounted in said assembly, said frame comprising two ring-shaped elements having circular central openings therein and secured together in spaced-apart, parallel and co-axial relation, and a plate member of opaque material having two rows of perforations therethrough, which rows cross at a right angle about a common central perforation, the diameters of said openings being greater than the length of each said row and said plate member having straight and parallel side edge portions and arcuate top and bottom edge portions interconnecting said side edge portions, a pair of segmental guide and spacing means intermediate said elements for maintaining said elements spaced apart a distance substantially the same as the thickness of said plate member, said means each having a straight edge and being disposed on opposite sides of said openings with the straight edges thereof spaced outwardly from said openings and extending parallel to each other, the space between said elements and intermediate said last-mentioned edges being unobstructed for permitting insertion and withdrawal of said plate member between said elements and said spacing means, the distance between said side edge portions of said plate member being greater than the diameter of said central openings in said elements and being substantially the same as the spacing between said straight edges of said spacing means, whereby said last-mentioned straight edges may engage and guide said side edge portions, and the distance between said top and bottom edge portions of said plate member being greater than the diameter of said central openings, whereby when said plate member is inserted between said elements with said central perforation thereof co-axial with said central openings, light is prevented from passing through both said openings except through said perforations in said plate member, and a handle secured to and extending outwardly from said top edge portions of said plate member, said handle also extending outwardly of said elements with said plate member therebetween.

References Cited in the file of this patent

UNITED STATES PATENTS

| 1,368,608 | Curran | Feb. 15, 1921 |
| 1,664,137 | Stewart et al. | Mar. 27, 1928 |
| 2,145,427 | Morris | Jan. 31, 1939 |
| 2,703,281 | Consaul et al. | Mar. 1, 1955 |

FOREIGN PATENTS

| 562,381 | France | Sept. 1, 1923 |
| 125,501 | Switzerland | Feb. 15, 1927 |
| 478,346 | Italy | Feb. 23, 1953 |